E. B. CROCKER.
RELEASING DEVICE.
APPLICATION FILED MAY 28, 1913.
1,130,803.
Patented Mar. 9, 1915.
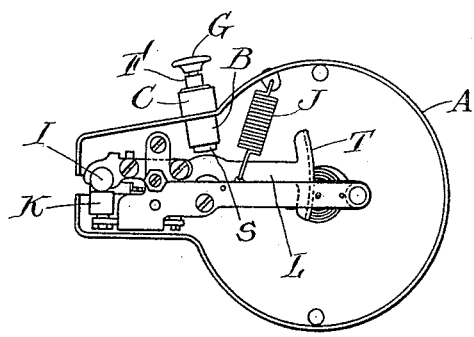
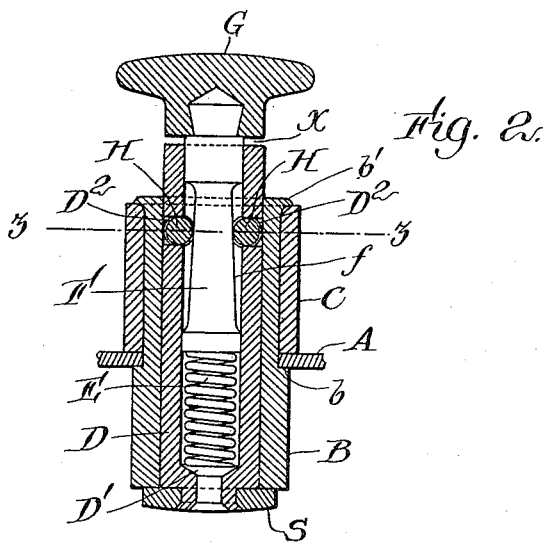
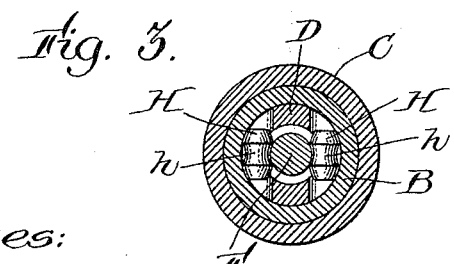
Witnesses:
Josephine H. Ryan
Charles D. Woodberry
Inventors:
Ernest B. Crocker
by Roberts & Roberts Cushman
Attorneys.

ly to releasing devices,

UNITED STATES PATENT OFFICE.

ERNEST B. CROCKER, OF BRIDGEPORT, CONNECTICUT, ASSIGNOR TO THE ASHCROFT MANUFACTURING COMPANY, OF BRIDGEPORT, CONNECTICUT, A CORPORATION OF CONNECTICUT.

RELEASING DEVICE.

1,130,803. Specification of Letters Patent. Patented Mar. 9, 1915.

Application filed May 28, 1913. Serial No. 770,308.

*To all whom it may concern:*

Be it known that I, ERNEST B. CROCKER, a citizen of the United States, and resident of Bridgeport, in the county of Fairfield and State of Connecticut, have invented new and useful Improvements in Releasing Devices, of which the following is a specification.

This invention relates to releasing devices, and more particularly to releasing devices peculiarly adapted for use in opening and retarding the sudden closing of the measuring jaws of gages of the type shown in Letters Patent of the United States No. 1,027,827, granted to Howard E. Eddy and myself May 18, 1912. In the said patent a spring normally holds the presser foot, or movable measuring jaw, in engagement with the anvil, or fixed measuring jaw, and a plunger is provided adapted when depressed to lift the presser foot from the anvil to facilitate the insertion of the sheet of material to be measured, and when released permits the said spring to move the presser foot into engagement with the surface of the sheet. Actual experience with the said instrument in service has demonstrated that the original releasing mechanism shown in said patent while mechanically adequate, proves a source of injury to the instrument in the hands of careless or inexperienced users who often depress the plunger and suddenly release it, so that the gage hand is snapped violently back to zero position, thus bending it or loosening it upon its arbor. It will be apparent that when the hand is thus bent or loosened the accuracy and therefore the usefulness of the device is impaired. Experience has further demonstrated that it is not uncommon for thoughtless or inexperienced users of these gages to remove their finger from the plunger and violently to pull out material which has been clamped in the jaws for measurement. The result is that the jaws come together with a snap and the gage hand is violently whipped back to zero and bent or loosened.

It is the object of this invention to provide a releasing device which will eliminate this element of damage to the instrument in service.

Referring to the drawings, which illustrate an embodiment of my invention,— Figure 1 is a front view of a gage of the type hereinbefore named, the casing dial and hand being removed and showing my improved releasing device in operative position upon the gage casing; Fig. 2 is an enlarged sectional view of my improved releasing device; and Fig. 3 is a section on the line 3—3, Fig. 2.

The gage casing A is provided with an opening in which is mounted, in any suitable manner, a cylindrical rod guide B. Preferably, the guide B is provided with a circumferential flange $b$ adapted to engage the casing A on its inner side, and a circumferential flange $b'$ at its top between which and the casing A is a sleeve C secured to the case of the instrument. Slidably mounted in said guide and projecting from the top thereof, is a hollow cylindrical push rod D having a collar S suitably secured upon its lower end and provided with a shoulder $D'$ and a pair of oppositely disposed slots or grooves $D^2$. Seated upon said shoulder $D'$ is a coil spring E, upon which is slidably mounted a stem F having a tapering portion $f$, as shown, and projecting beyond the top of the push rod D. To the top of said stem F is secured in any suitable manner a cap or push button G. The stem F is of such length and projects beyond the top of the rod D for such a distance that the cap or button G secured thereto and the top of the push rod D are spaced apart leaving a gap, as clearly shown at X in Fig. 2.

Within the slots or grooves $D^2$ are friction rolls H, preferably of the form best shown in Fig. 3, having a circumferential groove $h$ adapted to fit the cylindrical stem F and having their ends rounded to permit them readily to engage and rotate upon the cylindrical wall of the rod guide B. The said friction rolls H normally engage the stem F, and by reason of the tension of the spring E said rolls are pressed outward by said stem F against the wall of the guide B, thus frictionally locking the rod D against movement within its guide. While the provision of a pair of slots or grooves $D^2$ with rolls H therein as shown, is the preferred construction, the number of slots and rolls is not essential. If desired, a single slot or groove $D^2$ and single roll H may be employed, or more than two may be provided. Further, if desired, balls or other usual forms of rollers may be used in place of the particular rolls H, and the stem F may be fluted instead of round, as shown.

The operation of the device is as follows: The user desiring to release or lift the jaw, or presser foot I, to insert the material to be tested, places his finger upon the button G and depresses it, closing the gap at X. The stem F is thus pushed down against the spring E, releasing the friction rolls $D^2$. The spring E is lighter than the spring J, which normally holds the presser foot in contact with the anvil K, so that the compression necessary to close the gap at X and release the friction rolls $D^2$ is obtained without extending the spring J which would raise the presser foot and move the hand on its dial. The friction rolls being thus released and the gap at X closed, further downward pressure upon the button G causes the push rod to slide in the guide B and to engage the lever L to which the presser foot is secured, extending spring J, rocking said lever and lifting the presser foot. If now the user without inserting material between the measuring jaws, i. e., the presser foot I and anvil K, suddenly removes his finger from the button G, or pulls out the material or sheet from between the jaws of the instrument without holding the button down, the spring E, which is under compression at the end of the stem F, forces said stem upward or outward causing the tapered portion $f$ sharply to engage and drive the friction rolls H outward in their slots $D^2$ against the wall of the guide B, thereby arresting the further outward movement of the push rod D, locking said rod and preventing the closing of the measuring jaws. Thus, sudden and violent movement of the lever L and presser foot I is prevented so that the spring J does not snap the jaws together and violently whip the hand back to zero position. It will be apparent that upon the sudden release of the button as above described, some movement of the segment T, and consequently of the gage hand, will result before the frictional locking mechanism has stopped the upward movement of the push rod. This movement of the hand is, however, limited, and its arrest is gradual so that no damage results.

To unlock the rolls H and allow the push rod D to slide outward so that the presser foot or jaw I may return to normal closed position, the button G is depressed sufficiently to close the gap at X, thus pushing the stem F downward against the spring E and releasing the rolls H so that the push rod D may slide freely in the guide.

If the device is properly operated, the frictional locking means above described are not brought into action. If the user gently releases the pressure on the button G, holding his finger upon the button, but releasing it slightly and slowly, there is not sufficient thrust upon the rolls H to lock the mechanism, the gap at X being kept closed by reason of the fact that the tension spring J overcomes the release spring E.

I claim:—

1. The combination in a gage, of measuring jaws, resilient means normally urging the jaws to position of closure, means to open said jaws, and means to retard the otherwise ungoverned action of the resilient closing means to prevent the sudden closing of said jaws.

2. The combination in a gage having measuring jaws, comprising a fixed member and a movable member, of resilient closing means normally urging the jaws to position of closure, means to move said movable members away from said fixed member, and means to retard the otherwise ungoverned action of the resilient closing means to prevent the sudden closing of said jaws.

3. The combination with a gage having a casing and measuring jaws, comprising a fixed member and a pivoted member, of means adapted normally to hold said pivoted member in engagement with said fixed member, a guide mounted on said casing, a push rod slidably mounted in said guide, means to lock said rod against movement in said guide, and means to release said locking means.

4. The combination with a gage having a casing and measuring jaws, comprising a fixed member and a pivoted member, of means adapted normally to hold said pivoted member in engagement with said fixed member, a guide mounted on said casing, a push rod slidably mounted in said guide, means frictionally to lock said rod against movement in said guide, and means to release said locking means.

5. The combination with a gage having a casing and measuring jaws, comprising a fixed member and a pivoted member, of means adapted normally to hold said pivoted member in engagement with said fixed member, a guide mounted on said casing and having a slot, a push rod slidably mounted in said guide, a roller in said slot, means normally to hold said roller in engagement with said guide to lock said rod against movement, and means to release said roller.

6. The combination with a gage having a casing and measuring jaws, comprising a fixed member and a pivoted member, of means adapted normally to hold said pivoted member in engagement with said fixed member, a guide mounted on said casing and having a slot, a push rod slidably mounted in said guide, a roller in said slot, a stem within said rod, means adapted normally to hold said stem in engagement with said roller to lock said rod against movement within said guide, said stem adapted when depressed to release said roller and unlock said rod.

7. The combination with a gage having normally closed measuring jaws, of a casing, a guide mounted on said casing and having a slot, a push rod slidably mounted in said guide, a roller in said slot, a stem within said rod and projecting therefrom, a spring adapted normally to hold said stem in engagement with said roller to lock said rod against movement in said guide, a head on the projecting portion of said stem, said head and said rod being spaced apart whereby pressure upon said head will release said roller and unlock said rod without moving said rod in its guide.

8. The combination with a gage having normally closed measuring jaws, of a casing, a guide mounted on said casing, a push rod slidably mounted in said guide and having a pair of oppositely disposed slots, friction rolls in said slots having circumferential grooves and rounded ends, a stem within said rod having a tapered portion and projecting therefrom, means adapted normally to hold said tapered portion of said rod in engagement with said rolls to lock said rod against movement in said guide, a head on the projecting portion of said stem, said head and said rod being spaced apart whereby pressure upon said head will release said rolls and unlock said rod without moving said rod in its guide.

Signed by me at Bridgeport, Connecticut, this 22nd day of May, 1913.

ERNEST B. CROCKER.

Witnesses:
S. F. CONE,
H. P. GOODWIN.

Copies of this patent may be obtained for five cents each, by addressing the "Commissioner of Patents, Washington, D. C."